Feb. 20, 1962 M. D. LARSEN 3,022,001
MULTI-SCALED SLIDE RULES
Filed June 2, 1959
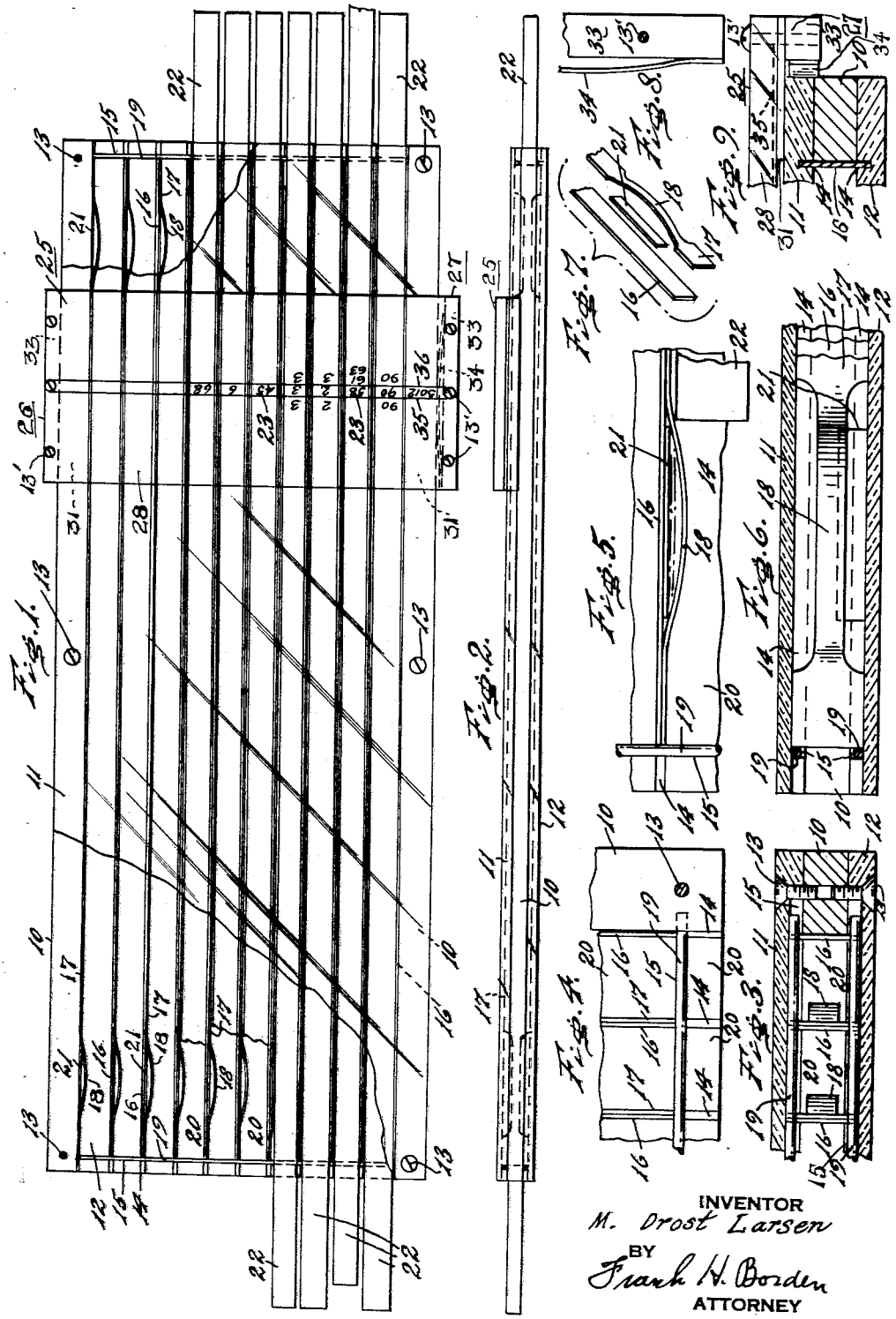
INVENTOR
M. Drost Larsen
BY
Frank H. Borden
ATTORNEY

United States Patent Office 3,022,001
Patented Feb. 20, 1962

3,022,001
MULTI-SCALED SLIDE RULES
Mogens Drost Larsen, 23 Amundsensvej,
Lyngby, Denmark
Filed June 2, 1959, Ser. No. 817,606
11 Claims. (Cl. 235—69)

This invention relates to multi-scaled slide rules.

Slide rules have been developed which are designated direct reading frequency response slide rules, in which a plurality of scale sticks are disposed for longitudinal adjustments in a hollow frame or housing. Each of said sticks displays a longitudinally extending column of numbers. By related adjustments of the respective sticks a transverse series of successive numbers can be scanned and summated. The system involved forms no part of the present invention. However as previously developed the prior practice was to dispose the scale sticks in mutual lateral abutting relation in the hollow frame. Such arrangement has been found to be objectionable and markedly reduces the efficiency and accuracy of the slide rule. This is for the reason that the laterally abutting sticks may have too much or too little friction between adjacent sticks. If too little the given stick has no anchorage against longitudinal free movement so that it moves freely in response to slight forces on the stick, whether by inadvertent contact during adjustments of other sticks, or of gravity in manipulations of the slide rule. If there is too high a frictional effect between sticks, the longitudinal adjustment of a given stick finds the contiguous stick also moved. This necessitates simultaneous manual contact of at least two sticks, which is awkward. It will be appreciated that this type of assembly greatly increases errors in the slide rule summations, as well as greatly increasing the time required in establishing the exact settings required of the scale sticks. It has been common practice in all known slide rules to take readings by means of a single line on a slider. This has been found inadequate for the prompt and accurate reading of a series of aligned numbers.

It is among the objects of this invention: to improve slide rules; to provide a slide rule with a plurality of scale sticks susceptible to respective controlled adjustments without mutual lateral contact; to provide a hollow frame or housing for a slide rule with partition means dividing the space in the frame into channels or open-ended compartments for the reception of plural scale sticks; to provide in a multi-channel slide rule frame friction devices in each channel for engagement with scale sticks inserted therein; to provide a slide rule with a plurality of numeral-bearing scale sticks having laterally aligned numerals, with a transparent slider movable longitudinally of the relatively adjusted sticks and having two parallel transverse lines or cursors spaced apart a distance permitting bracketing of the respective numerals in lateral alignment; other objects and advantages will become more apparent as the description proceeds.

In the accompanying drawings forming part of this description:

FIG. 1 represents a plan of the invention in a purely illustrative form, having ten channels, mounting a smaller number of scale sticks, some of which are broken away, with the transparent cover plate broken away to show the structure below the plate, with a superposed slider having a transparent member bearing spaced parallel sight lines or cursors bracketing an illustrative purely random series of numerals on the sticks.

FIG. 2 represents a side elevation of the structure of FIG. 1.

FIG. 3 represents a fragmentary enlarged section through the slide rule with the scale sticks removed for clarity.

FIG. 4 represents a fragmentary enlarged plan of the slide rule at one end, with the transparent cover plate removed.

FIG. 5 represents a fragmentary enlarged plan of the elements defining one side of an end compartment or channel, with the end of a stick juxtaposed to the friction element thereof prior to engagement therewith, and with the cover plate removed.

FIG. 6 represents a fragmentary vertical section through the slide rule, showing the channel side wall, on an enlarged scale.

FIG. 7 represents a fragmentary exploded perspective of the elements of a channel side wall.

FIG. 8 represents a fragmentary plan of one side of the slider device with the cover removed, showing its friction element for engaging the side of the housing.

FIG. 9 represents a fragmentary vertical section through one side of the slider device-engaged portion of the housing, showing one side of the slider device in elevation.

The slide rule frame or housing according to the invention is comprised of longitudinally extended parallel metallic side members 10—10, to which are secured first and second, or upper and lower cover plates respectively 11 and 12, as by sets of screws 13—13. The cover plates are preferably transparent and are provided on their internally confronting faces with longitudinal slots 14—14, generally normal to the plates. Adjacent each end each cover plate is formed with a transverse slot 15, intersecting all longitudinal slots 14. While the cover plates may be glass, it is preferred to form them of acrylic material.

It will be seen that the cover plates and side members form a hollow housing or frame. It is desired to mount channel-defining partitions in the hollow frame forming with the cover plates substantially rectangular channels extending in parallelism longitudinally of the frame, and to have one side of each channel provided with friction elements to bear against inserted scale sticks. In effecting this result with precision and economy multiplicities of elements are provided, comprising elongated sheet metal strips 16, similarly elongated friction partition strips 17, and short reinforcing backing units 21.

It will be understood that each slot 14 in cover plate 11 confronts and is registered with a slot 14 in the cover plate 12 across the thickness of the hollow frame. Each strip 16 is substantially rectangularly shaped and is of proper width as to seat in a pair of registering slots 14—14, and is of such length that its ends are spaced the same distance as the distance between the respective transverse slots 15. The friction partition strip 17 is substantially of the same length and throughout its major portion is of substantially the same width as the partition strip 16. Near its ends strip 17 is reduced in width in a portion 18 which is arcuately bowed out of the plane of the strip.

In the purely illustrative organization of FIG. 1, it will be observed that there are eleven pairs of registering slots 14, and this requires sets of ten of the respective strips 16 and 17, disposed as follows: In the intermediate nine pairs of slots a pair of strips 16 and 17 are disposed in contacting parallelism in each of said nine pairs of slots, with the bowed portions 18 projecting in the same direction toward one side member 10. In the slots adjacent to the other side member 10 the remaining strip 17 is mounted with its bowed portion 18 projecting toward said first side member. In the slots adjacent to the said first one side member the remaining strip 16 is disposed. It will be seen that thereby ten channels are established, each having a bowed partition strip 17 on one side and a complemental strip 16 on the other. To prevent undue yielding and collapse and to minimize elongation of the friction partition strips 17, it is preferred to provide in one of the slots 14 of a pair a reinforcing insert unit 21 disposed behind each bowed out portion 18 engaging the strip 16 or a side member 10, as the case may be. Each unit 21 is of slightly less longitudinal extent than that of the arcuate portion 18. These stiffen the friction portions 18.

After all of the strips and reinforcing units have been properly mounted in the slots 14, linear wires 19 are disposed in the respective slots 15 to anchor the strips 16 and 17 against longitudinal movement.

Each stick 22 is rectangular in section and is inserted longitudinally into its respective compartment or channel 20, engaging and compressing laterally the respective bowed out arcuate friction portions 18 of the strip 17. Owing to the backing provided by the reinforcing units 21, the lateral collapse of the portions 18 is minimal, while permitting each stick 22 to pass longitudinally of its channel under manual pressure. Each portion 18 has such frictional engagement with its stick as to hold the latter in a given manually set position, and as there is a friction element toward each end of the channel prolonged longitudinal adjustment cannot release the stick from more than one such friction element.

It will be understood that each scale stick 22 will have on at least one surface, and preferably on two opposite surfaces, a column or columns of numerals each readable transversely of the stick surface. Numerals 23 of FIG. 1 are purely random numbers but illustrative of the aligned series to be read, as for summations or the like.

A slider 25 is provided formed of spaced runners 26 and 27, which are basically identical, on which is superposed a connecting transparent sighting strip 28. The assembly is connected together in any suitable manner, as by crews 13'. Each of the runners incorporates a narrow thin sheet 31 extending the full width of the sighting strip 28 and of such width as to overlie the cover plate 11 (or 12), and the instant side member 10. From the lower outer edges of the thin sheets 31 depends a guide block 33. The respective guide blocks are parallel to each other and to the lateral edges of the hollow frame. The runner 27 is a friction runner and is modified from the basic structure by the addition of an arcuate spring 34 anchored at one end to the inner surface of the block 33 with its free end slidable on that same surface as the spring is compressed as an incident to mounting of the slider on the hollow frame for sliding longitudinally thereof. It will be seen that the provision of the thin sheets 31 spaces the transparent sighting strip 28 slightly from the outer surface of the cover plate between the end partitions to minimize scratching of the sighting strip. The parallel spaced bracketing lines 35 and 36 are provided in any desired manner and preferably on the lower surface of the sighting strip 28 as by depositing suitable pigment in grooves therein.

It will be seen that the multi-channel slide rule frame is precise in structure and that the friction effects are uniform in all channels, and the frame holds and guides each stick separately, whereby each stick can be separately and accurately adjusted without disturbing any other sticks. Moreover when set each stick is held by a frictional grip adequate to maintain its set position whether engaged by only one or both of the frictional elements despite manipulations of the entire asembly. It will be seen, furthermore, that the slider can be used with relation to either cover plate, will frictionally retain an established setting, and is operative relative to the numerical indicia on both sides of the scale sticks.

I claim as my invention:

1. A multi-channel slide rule frame for use with a plurality of scale sticks, comprising a hollow device formed of spaced parallel plates at least one of which is transparent, said plates having inner surfaces in mutually confronting relation, and spaced parallel side members connecting said plates, a plurality of longitudinal grooves formed in the inner surfaces of both plates parallel to and in even spacing between said side members, with each groove in one plate in aligned registration with a groove in the other plate to form pairs of grooves, a transverse groove formed on the inner surface of each plate toward each end thereof and intersecting all of the longitudinal grooves therein, partition means in each pair of grooves forming with the plates a plurality of parallel longitudinally extending channels, and linear means recessed in said transverse grooves and anchoring said partition means.

2. A frame as in claim 1, in which said partition means has a composite construction and on one side comprises a generally planar surface along which a scale stick is slidably guideable, and on the other side said partition means includes a discrete resilient contact element spaced from said generally planar surface and serving as a friction device for sliding contact with an adjacent channel-inserted scale stick.

3. A frame as in claim 1, in which said partition means comprises two individual strips in mutual contact, one of said strips comprising a generally planar stick-guiding surface facing one of said channels, the other of said strips comprising a friction strip facing an adjacent channel slidably engageable by a channel-inserted scale stick.

4. A frame as in claim 3, in which said friction strip has a generally planar portion and an arcuate projection out of the plane of said portion, said arcuate projection comprising the stick-guiding surface in said adjacent channel.

5. A frame as in claim 4, in which said planar portion is a major portion of said friction strip and is of such width as to engage in its pair of slots, and a minor portion of less width is bowed out of the plane of the major portion and comprises said projection.

6. A frame as in claim 5, in which the minor portion is comprised of two bowed out portions respectively adjacent to the respective ends of the friction strip.

7. A frame as in claim 5 and a unit of less length than that of said minor portion disposed in one groove of the pair in which said partition means is engaged and disposed behind the arcuate projection to reinforce and minimize the collapse of said arcuate projection.

8. A frame as in claim 1, and a plurality of scale sticks each bearing transversely readable numbers and disposed respectively in the respective channels, and a slider mounted on said frame and comprising spaced guide means and a transparent sight layer, said transparent sight layer bearing two parallel spaced lines extending transversely across said sticks and bracketing a numeral on each stick in a transverse series of numbers.

9. A frame as in claim 8, in which the sight layer is spaced from the outer surface of an adjacent cover plate to minimize scratching.

10. A frame as in claim 9, in which the guide means comprises a thin sheet mounting a guide block on opposite sides of said frame, said thin sheet overlying and slidable on the edges of an adjacent cover plate, and said transparent layer extending across and superposed on the respective guide blocks to establish said layer spacing.

11. A frame as in claim 10, in which the guide block of said guide means on one side of the frame engages the edge of said frame and the guide block on the other side of the frame is out of direct contact with said frame, and spring means mounted on said last mentioned guide block engaging the other side of said frame and exerting frictional restraint on said slider.

References Cited in the file of this patent

UNITED STATES PATENTS

| | | |
|---|---|---|
| 990,779 | Roberts | Apr. 25, 1911 |
| 1,075,652 | Kleber | Oct. 14, 1913 |
| 1,843,785 | Roberts | Feb. 2, 1932 |
| 2,086,502 | Keuffel | July 6, 1937 |
| 2,625,455 | Mitten | Jan. 13, 1953 |